(12) United States Patent
Shibuya

(10) Patent No.: US 6,780,135 B2
(45) Date of Patent: Aug. 24, 2004

(54) AUTOMOBILE TRANSMISSION

(75) Inventor: Keisuke Shibuya, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/719,141

(22) Filed: Nov. 20, 2003

(65) Prior Publication Data
US 2004/0099073 A1 May 27, 2004

Related U.S. Application Data

(62) Division of application No. 09/765,762, filed on Jan. 18, 2001.

(30) Foreign Application Priority Data

Jan. 28, 2000 (JP) .......................................... 2000-19935

(51) Int. Cl.⁷ ............................................... F16H 37/08
(52) U.S. Cl. ........................ 475/206; 475/200; 74/331
(58) Field of Search ........................... 74/331; 475/200, 475/204, 206; 180/248

(56) References Cited

U.S. PATENT DOCUMENTS

| | | | |
|---|---|---|---|
| 2,844,973 A | | 7/1958 | Hill |
| 3,611,832 A | | 10/1971 | Vollmer |
| 4,499,791 A | | 2/1985 | Brisabois |
| 4,744,437 A | * | 5/1988 | Matsumoto ................ 180/249 |
| 4,750,580 A | * | 6/1988 | Umemoto .................. 180/247 |
| 5,069,305 A | * | 12/1991 | Kobayashi ................. 180/249 |
| 5,429,005 A | * | 7/1995 | Fukui et al. ................. 74/325 |
| 5,640,882 A | | 6/1997 | Mueller |

FOREIGN PATENT DOCUMENTS

| | | | |
|---|---|---|---|
| EP | 0386922 | | 9/1990 |
| FR | 2353762 | | 12/1977 |
| JP | 55004292 A | | 1/1980 |
| JP | 55004293 A | | 1/1980 |
| JP | 55017727 A | | 2/1980 |
| JP | 61-295134 | * | 12/1986 ................ 180/197 |
| JP | 01156134 A | | 6/1989 |
| JP | 07-167257 | | 7/1995 |

OTHER PUBLICATIONS

Patent Abstracts of Japan.

* cited by examiner

Primary Examiner—Ha Ho
(74) Attorney, Agent, or Firm—Martin A. Farber

(57) ABSTRACT

A crankshaft of an engine is coaxially connected with a main shaft of a transmission through an input shaft. In the transmission, a counter shaft is incorporated below and in parallel with the main shaft. There are provided a main transmission and a sub transmission between the main shaft and the counter shaft. The driving force of the engine is divided into a front driving force and a rear driving force by a center differential and the front driving force is transmitted from the counter shaft to front wheels through a front drive shaft incorporated below and in parallel with the counter shaft and a front differential. The rear driving force is transmitted to rear wheels through a rear drive shaft and a rear differential.

3 Claims, 8 Drawing Sheets

4: TRANSMISSION CASE
7: INPUT SHAFT
8: CRANK SHAFT
11: MAIN SHAFT
12: COUNTER SHAFT
13: MAIN TRANSMISSION
14: SUB TRANSMISSION
41: REAR DRIVE SHAFT
44: FRONT DRIVE SHAFT
46: FRONT DIFFERENTIAL

AUTOMOBILE TRANSMISSION

RELATED APPLICATION

This application is a continuing divisional application of my co-pending application Ser. No. 09/765,762 filed Jan. 18, 2001. The entire disclosure of which is considered as being part of the disclosure of this continuing divisional application and is hereby incorporated by reference herein in its entirety.

BACKGROUND OF THE INVENTION

1. Field of the Invention

The present invention relates to a transmission for a vehicle and more particularly to an automobile transmission which can be assembled using components shared among a plurality of transmission types.

2. Discussion of Prior Arts

A transmission for transmitting engine power to driving wheel and for changing engine rotational speeds, is connected with a crankshaft of an engine through a clutch and has a main shaft and a counter shaft provided in parallel with the main shaft. The main shaft is provided with a plurality of driving gears and the counter shaft is provided with a plurality of driven gears meshing with the driving gears. When a driver operates a shift lever, a power transmission path obtained by a gear set of a driving gear and driven gear is established.

There is no difference in the basic construction between a transmission for front wheel drive vehicle and one for four wheel drive vehicle.

In case where the engine is mounted in the longitudinal direction of the vehicle, since the transmission is connected with the rear end of the engine, a power unit of the combination of the engine and transmission is required to reduce its own length so as to secure a space utility of the passenger compartment of the vehicle.

To reduce the length of such a power unit, Japanese Patent Application Laid-open No. Toku-Kai-Hei 1-156134 discloses a drive train for automobile in which a longitudinally mounted engine is slanted in the widthwise direction and a final reduction gear unit or a differential separated from the transmission is disposed on the slanted side of the engine. In this case, the axle shaft penetrates the side wall of an oil pan and crankcase of the engine. Further, Japanese Patent Application Laid-open No. Toku-Kai-Hei 7-167257 discloses a technique in which the final reduction gear unit is integrated with the transmission. This type of drive train is characterized in a simple layout and a good mountability.

On the other hand, a multiple speed ratio transmission is required in market from the view point of vehicle performance. Particularly, in case of four wheel drive vehicles, a multiple speed ratio transmission or a dual range transmission is strongly requested. For example, Japanese Patent Application Laid-open No. Toku-Kai-Shou 55-4293 proposes a dual range type transmission having a sub-transmission between the crankshaft and the main shaft so as to change over the rotation speed of the crankshaft into two stages, Low and High, with respect to the main shaft.

In order to raise a productivity of transmissions, it is required that components of the transmission are shared between a plurality of models or body types. For example, it is required that components common to both front wheel drive vehicles and four wheel drive vehicles are used on assembling transmissions.

In response to these requirements, as disclosed in Toku-Kai-Hei 1-156134, in case where the final reduction gear unit is disposed on the side of the engine, the axle shaft penetrates the side walls of the oil pan and the crankcase. Accordingly, an attempt to apply a dual transmission mechanism to this type transmission elongates the longitudinal size of the transmission and as a result the layout of the drive train becomes more complicated.

Further, as shown in Toku-Kai-Hei 7-167257, in case where the final reduction gear unit is integrated with the transmission, the layout of the drive train is simplified, however since generally a front drive shaft is fitted to the hollow counter shaft, the length of the transmission increases. It is disadvantageous in length that a multiple speed ratio gearing mechanism or a dual range mechanism is further incorporated into the transmission.

SUMMARY OF THE INVENTION

It is an object of the present invention to provide a transmission whose drive train layout is simple, even in case where a multiple speed ratio transmission mechanism or a dual range mechanism is incorporated into the transmission. It is another object of the present invention to provide a compact transmission easy to be mounted on a vehicle. It is further object of the present invention to share components among a plurality of transmission types in order to reduce manufacturing cost of the transmission.

To achieve these objects, the present invention comprises a main shaft connected with a crankshaft of an engine through a clutch and having a plurality of first drive gears, a counter shaft provided below and in parallel with the main shaft and having first driven gears meshing with the first drive gears and having a second drive gear, a drive shaft provided below and in parallel with the counter shaft and having a second driven gear meshing with the second drive gear, a front differential provided at a front end of the drive shaft, a transmission case for accommodating the main shaft, the counter shaft, the drive shaft and the front differential, a space formed in a front part of the transmission case, a center differential provided at a rear end of the counter shaft for distributing driving force into driving force for front wheels and driving force for rear wheels, a sub transmission accommodated in the space for transmitting driving force of the engine to the main shaft while reducing the rotation speed of the engine.

DETAILED DESCRIPTION OF THE INVENTION

Figure 1:
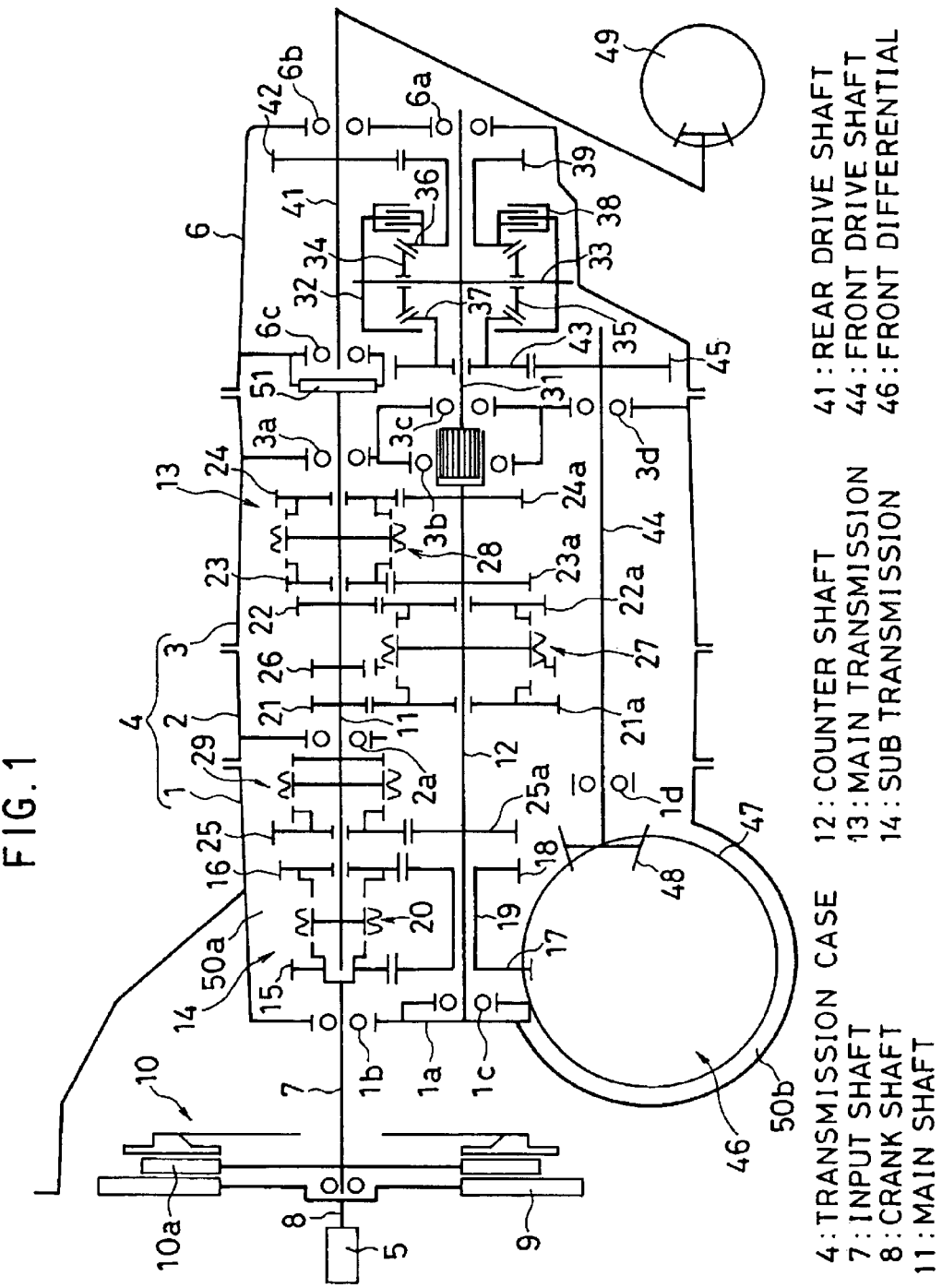
FIG. 1 is a skeleton diagram showing an automobile manual transmission according to a first embodiment of the present invention.

Referring to FIG. 1, numeral 4 denotes a transmission case including a front transmission case 1, an intermediate transmission case 2 and a rear transmission case 3. The transmission case 4 is connected at the front end thereof with an engine 5 which is longitudinally mounted in an engine room and is connected at the rear end thereof with an extension case 6.

An input shaft 7 is rotatably supported by a bearing 1b provided in a front wall 1a of the front transmission case 1. The input shaft 7 is connected with a flywheel 9 which is mounted on a crankshaft 8 of the engine 5 through a clutch 10. Further, the input shaft 7 is spline-fitted to a clutch hub 10a. A main shaft 11 extends coaxially with the input shaft 7 in the longitudinal direction of a vehicle and is rotatably mounted in the transmission case 4. The main shaft 11 is rotatably fitted at a front end thereof to a rear end of the input shaft 7 and is supported by the bearing 1b through the input shaft 7. Further, the main shaft 11 is supported at a rear end thereof by a bearing 3a provided in the rear transmission case 3. Furthermore, the main shaft 11 is supported at an intermediate portion thereof by a bearing 2a.

Further, a counter shaft 12 is rotatably mounted in the transmission case 4 in parallel with and below the main shaft 11. The counter shaft 12 is supported at a front end thereof by a bearing 1c provided in the front transmission case 1 and is supported at a rear end thereof by a bearing 3b provided in the rear transmission case 3.

A main transmission section 13 having five forward speeds is formed by gear sets provided between the main shaft 11 and the counter shaft 12 in the intermediate transmission case 2 and the rear transmission case 3. Further, a sub transmission 14 having two ranges of speed, high and low, is formed by gear sets provided between the input shaft 7, the main shaft 11 and the counter shaft 12 in the front transmission case 1.

The sub transmission 14 has an input gear 15 mounted on the input shaft 7, a driven gear 16 rotatably mounted on the main shaft 11 and a counter sleeve 19 rotatably mounted on the counter shaft 12 through a needle bearing. The counter sleeve 19 includes a counter gear 17 constantly meshing with the input shaft 15 and a low range gear 18 constantly meshing with the driven gear 16. There is provided a range changeover section 20 composed of a synchromesh having a sleeve 20a (see FIG. 2) and the like between the input gear 15 and the driven gear 16. When the range switching section 20 operates to engage the sleeve 20a with a spline of the input shaft 7, the input shaft 7 is connected with the main shaft 11. On the other hand, when the sleeve 20a is engaged with a spline of the driven gear 16, the rotation of the input shaft 7 is transmitted to the main shaft 11 through counter sleeve 19, while the rotation speed is reduced by a gear ratio, thereby a low range is obtained.

Thus constituted sub transmission 14 can utilize the counter shaft 12 of the main transmission 13 as a counter shaft for the sub transmission 14 without providing a counter shaft dedicated to the sub transmission. Accordingly, a longitudinal size of the overall transmission can be saved. Further, since a counter shaft dedicated to the subtransmission can be abolished, the number of parts can be reduced.

In the main transmission section 13, the main shaft 11 is provided with a first ($1^{st}$) speed gear 21, a second ($2^{nd}$) speed gear 22 which rotate integrally therewith and a third ($3^{rd}$) speed gear 23 and a fourth speed gear ($4^{th}$) which rotate freely thereabout. Further, the main shaft 11 is provided with a reverse gear 26 which rotates integrally therewith. Further, in the front transmission case 1, a fifth ($5^{th}$) speed gear 25 is rotatably mounted on the main shaft 11 adjacent to the sub transmission section 14.

A driven gear 21a constantly meshing with the first speed gear 21 and a driven gear 22a constantly meshing with the second speed gear 22 are rotatably mounted on the counter shaft 12. Further, a driven gear 23a constantly meshing with the third speed gear 23, a driven gear 24a constantly meshing with the fourth speed gear 24 and a driven gear 25a constantly meshing with the fifth speed gear 25 are securedly mounted on the counter shaft 12 to rotate integrally with the shaft 12.

The counter shaft 12 is provided with a synchromesh 27 having a sleeve 27a and the like between the driven gears 21a and 22a. When the sleeve 27a is engaged with a spline of the driven gear 21a, the rotation of the main shaft 11 is transmitted to the counter shaft 12 through the first speed gear 21. When the sleeve 27a is engaged with a spline of the driven gear 22a, the rotation of the main shaft 11 is transmitted to the counter shaft 12 through the first speed gear 22.

The sleeve 27a of the synchromesh 27 meshes with a reverse gear 26 through a reverse idle gear (not shown). The main shaft 11 is provided with a synchromesh 28 having a sleeve 28a and the like between the third speed gear 23 and the fourth speed gear 24. When the sleeve 28a is engaged with a spline of the third speed gear 23, the rotation of the main shaft 11 is transmitted to the counter shaft 12 through the third speed gear 23. When the sleeve 28a is engaged with a spline of the fourth speed gear 24, the rotation of the main shaft 11 is transmitted to the counter shaft 12 through the fourth speed gear 24.

The main shaft 12 is provided with a synchromesh 29 having a sleeve 29a and the like adjacent to the fifth speed gear 25. When the sleeve 29a is engaged with a spline of the fifth speed gear 25, the rotation of the main shaft 11 is transmitted to the counter shaft 12.

Thus, since the main transmission 13 has shift stages of five forward speeds and the sub transmission 14 has two speed ranges, high and low, this transmission is a dual range transaxle type transmission having shift stages of ten forward speeds in total.

Figure 3:
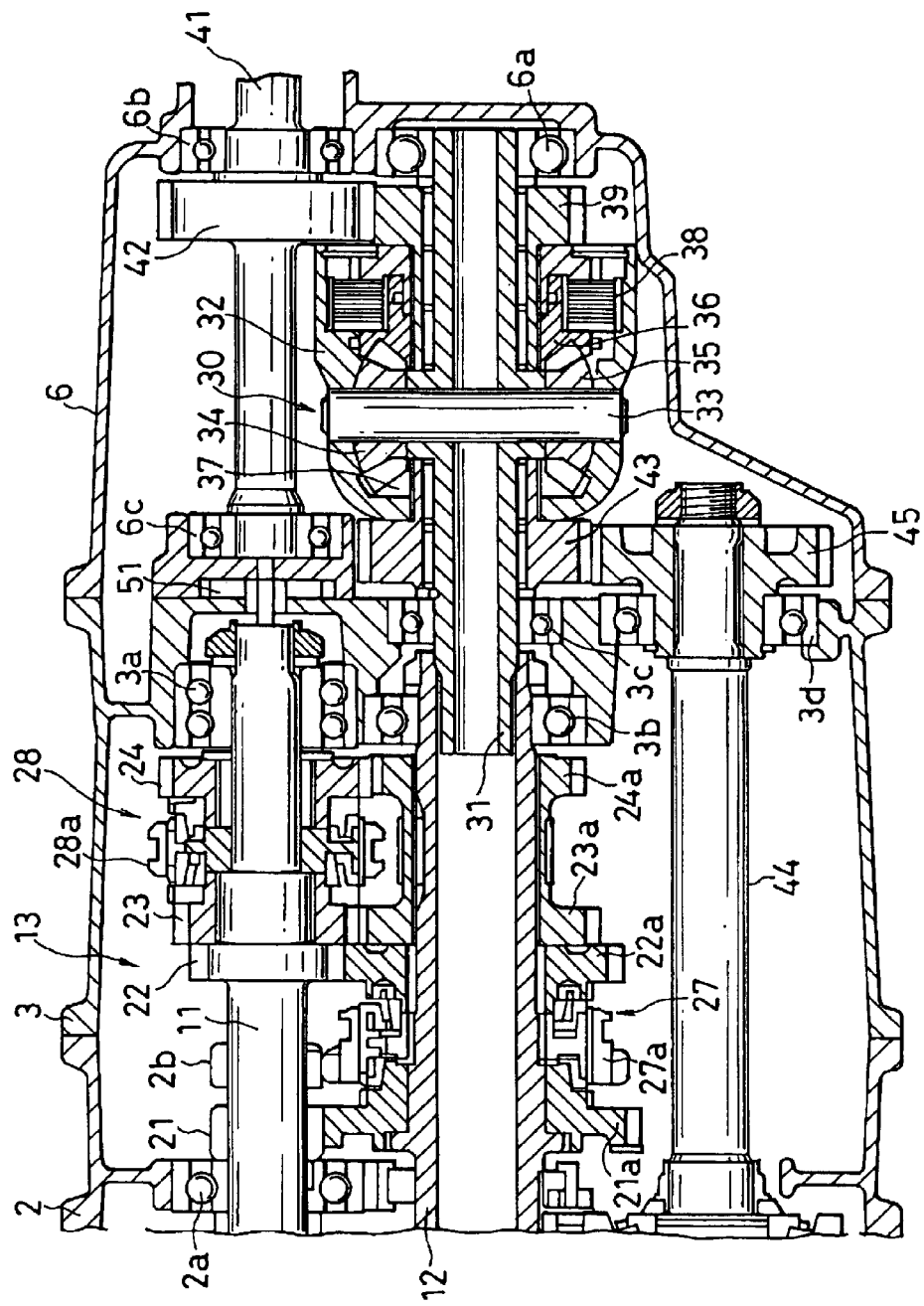
FIG. 3 is a partially sectional view showing a rear portion of the transmission of FIG. 1.

Referring to FIG. 3, there is provided a spline hole at the rear end of the counter shaft 12. The spline hole is engaged with an input shaft 31 of a center differential 30. Accordingly, the output of the main and sub transmissions 13, 14 is inputted to the center differential 30 through the counter shaft 12. The input shaft 31 is supported by bearings 3c and 6a.

The center differential 30 has a pinion shaft 33 fixedly penetrating the input shaft 31 in the radial direction thereof and secured to a differential case 32. Differential pinions 34, 35 are rotatably mounted on the pinion shaft 33 and mesh with differential-side gears 36, 37, respectively.

There is provided a viscous coupling 38 between the side gear 36 and the differential case 32. The differential side gear 36 is spline-fitted over a rear drive gear 39 which is rotatably mounted on the input shaft 31 through a needle bearing. The rear drive gear 39 meshes with a driven gear 42 of a rear wheel drive shaft or a rear drive shaft 41 rotatably supported by the extension case 6 through bearings 6b, 6c. The other differential side gear 37 is spline-fitted over a front drive gear 43 which is rotatably mounted on the counter shaft 12 through a needle bearing. The front drive gear 43 meshes with a driven gear 45 of a front wheel drive shaft or a front drive shaft 44 rotatably supported by bearings 1d, 3d.

Figure 2:
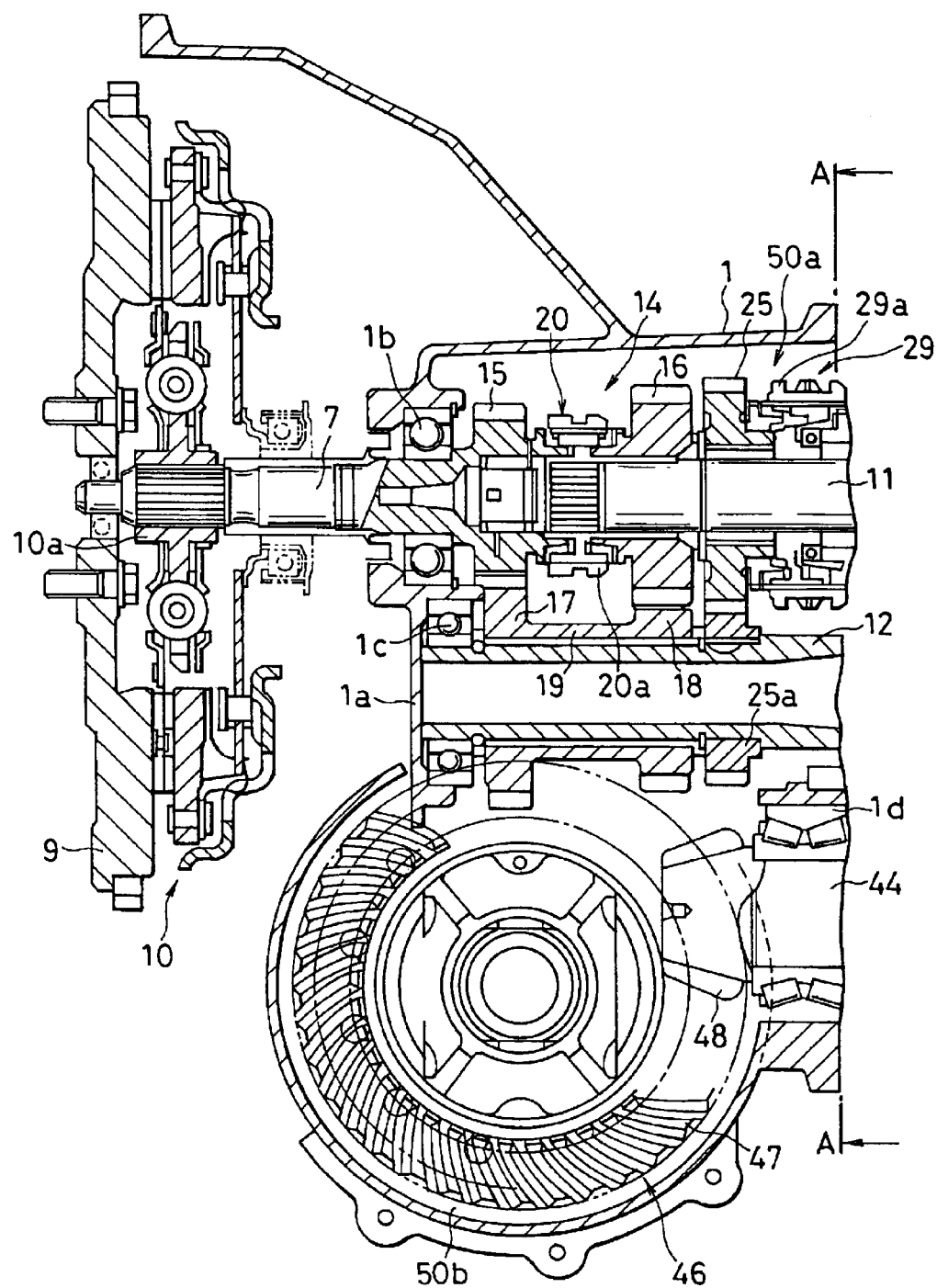
FIG. 2 is a partially sectional view showing a front portion of the transmission of FIG. 1.

As shown in FIG. 2, a front differential 46 is incorporated in the front transmission case 1. The front differential 46 includes a hypoid gear 46 which meshes with a hypoid pinion 48 secured to the front end of the front drive shaft 44.

Further, as shown in FIG. 1, the rear drive shaft 41 is connected with a rear differential 49 through a propeller shaft. Thus, the driving torque distributed by the center differential 30 is transmitted to front and rear wheels through the front and rear differentials 46, 49, respectively.

The front transmission case 1 has a space 50a partitioned by the intermediate transmission case 2 in the upper part thereof. This space 50a provides a sub transmission chamber accommodating the sub transmission 14 and the fifth speed gear 25 for high range. In the lower part of the front transmission case 1, a differential chamber 50b for accommodating the front differential 46 is formed.

As shown in FIG. 3, the partition wall between the rear end of the rear transmission case 3 and the bearing 6c is provided with an oil pump 51, whose drive shaft is connected with the rear end of the main shaft 11. Thus, the oil pump 51 is driven by the main shaft 11. The drive shaft of the oil pump 51 has a hollow hole through which oil is discharged. The discharged oil is supplied to hollow holes provided in the center of axis of the main shaft 11 and the counter shaft 12, that is, lubrication oil passages, to lubricate components of the transmission.

Figure 4:
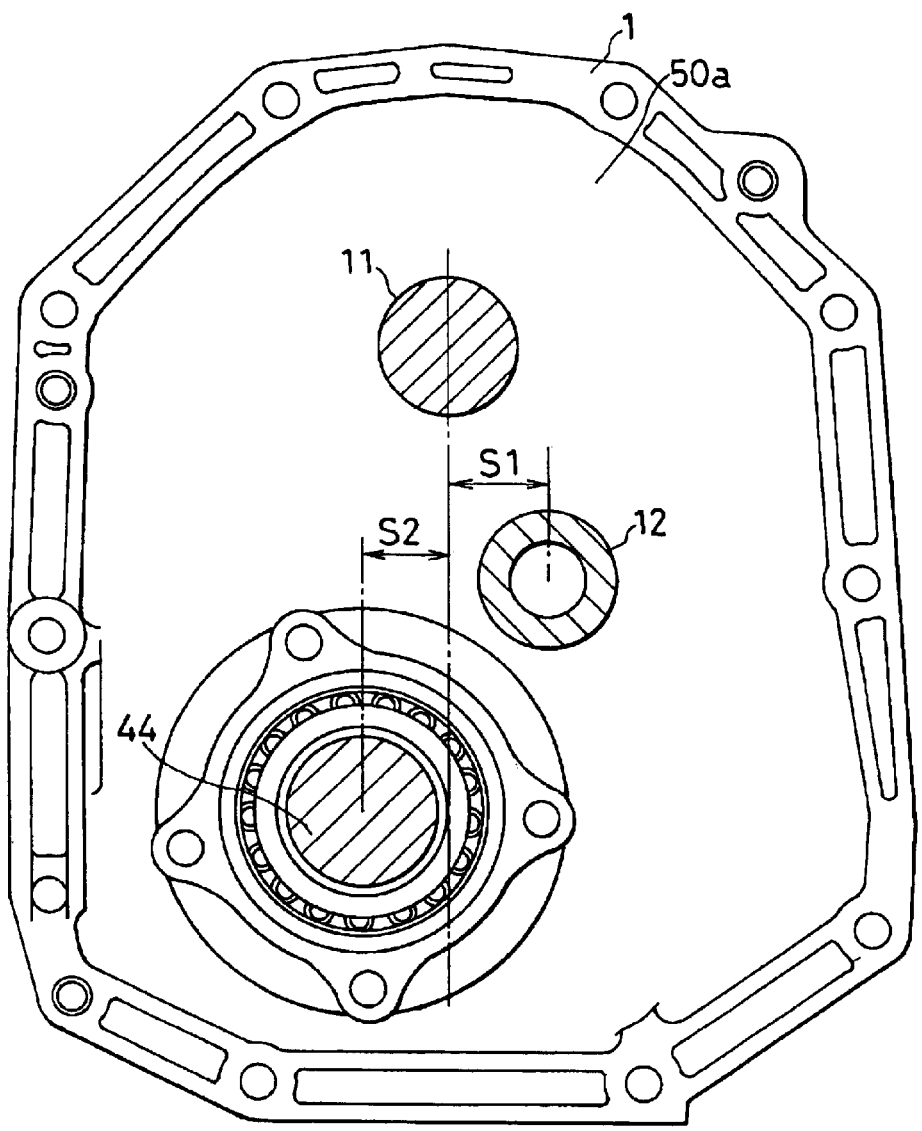
FIG. 4 is a sectional view taken along an A—A line Of FIG. 2.

Referring to FIG. 4, the counter shaft 12 is positioned below the main shaft 11 and its center of axis is offset by S1 in an one widthwise direction of the vehicle. Further, the front drive shaft 44 is offset by S2 in the other widthwise direction of the vehicle. This arrangement of the shafts 11, 12 and 44 is effective for reducing the vertical size of the transmission case 4.

Since in thus constructed transmission the front drive shaft 44 is arranged below the counter shaft 12 differently from a type of transmission in which the front drive shaft 44 is incorporated into the counter shaft 12, the sub transmission 14 can be incorporated between the main shaft 11 and the counter shaft 12 and at the same time the front differential 46 can be incorporated into the front transmission case 1 without enlarging the longitudinal size of the transmission. Further, since the longitudinal size of the transmission is reduced, an interior space of the passenger compartment can be secured and a power unit having a good mountability onto the vehicle is obtained.

A front wall 1a of the front transmission case 1 facing the clutch 10 is provided with bearings 1b, 1c. As shown in FIG. 4, since each of the transmission case 1, the intermediate transmission case 2 and the rear transmission case 3 has a cylinder-like configuration enclosing the main shaft 11 and the like peripherally, the strength of the transmission case 4 can be increased, compared to the transmission case having a longitudinal mating surface.

Further, since these transmission cases 1, 2 and 3 have a drum-like configuration respectively, the transmission can be assembled in an upright position and as a result the work efficiency is enhanced.

Figure 5:
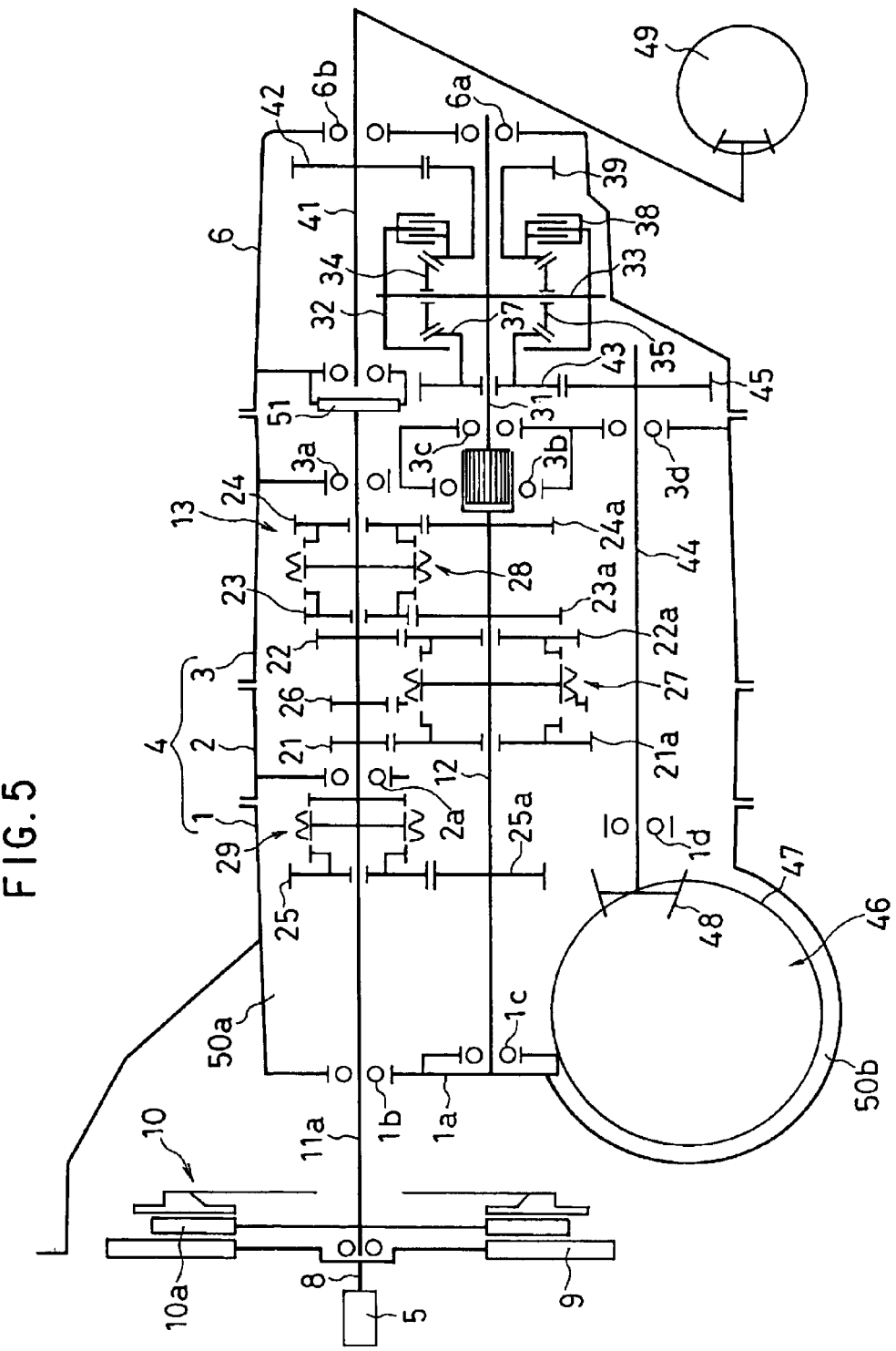
FIG. 5 is a skeleton diagram showing an automobile manual transmission according to a second embodiment of the present invention.
Figure 6:
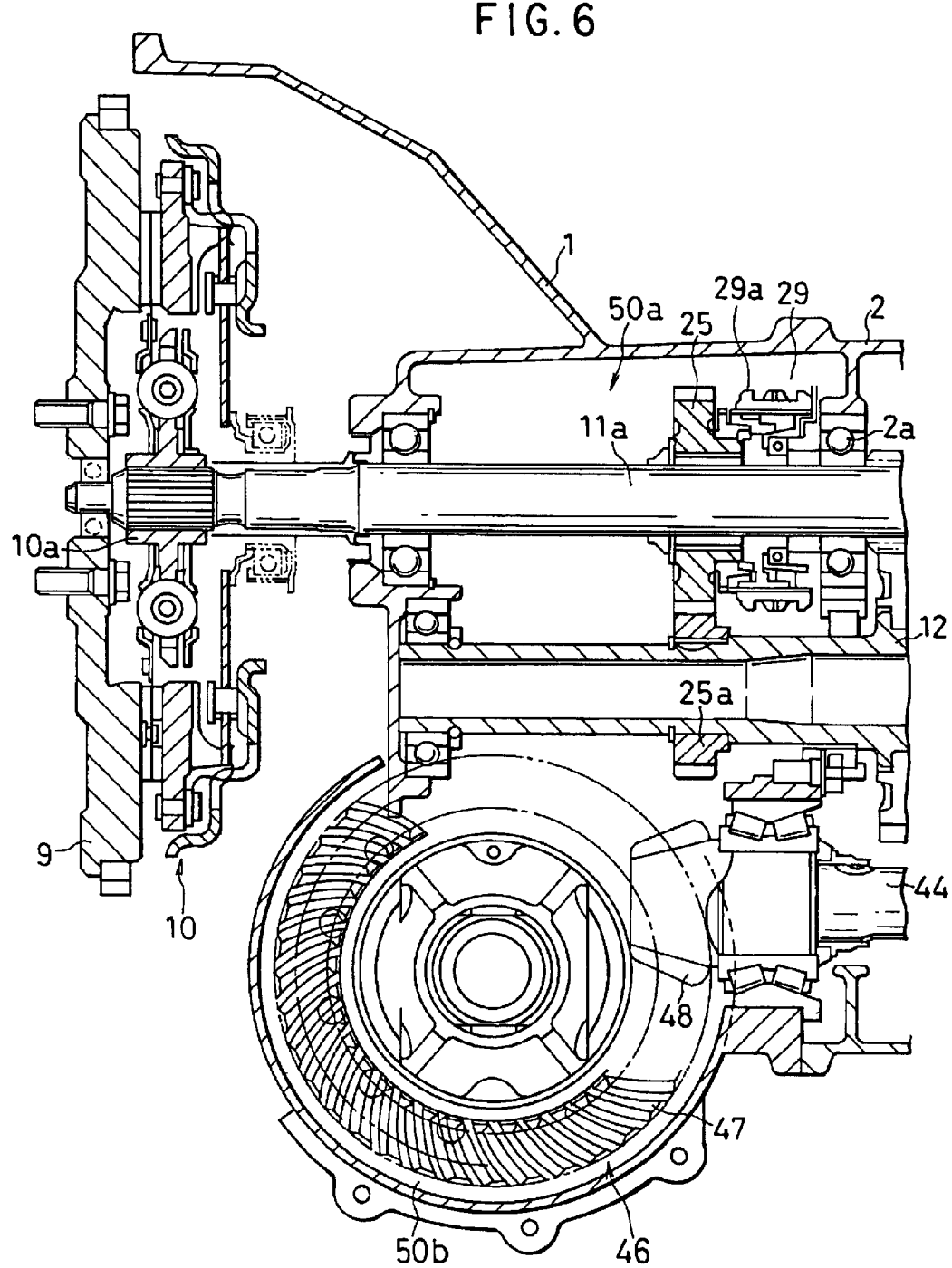
FIG. 6 is a partially sectional view showing a front portion of the transmission of FIG. 5.

Next, describing a second embodiment by reference to FIGS. 5 and 6, this manual transmission is applied to a four wheel drive vehicle similarly to the first embodiment but it is not provided with a sub transmission 14. In these drawings, the components identical both to the first and second embodiments are denoted by identical reference numbers. Accordingly, the transmission does not include an input gear 15, a driven gear 16, a counter sleeve 19 and a range changeover section 20. Further, since the transmission has no sub transmission, the input shaft 7 is replaced with a main shaft 11a. As shown in FIG. 6, a front end of the main shaft 11a is spline-fitted to a clutch hub 10a.

On the other hand, since this transmission has the same structure as the transmission of FIG. 3 except the components for the sub transmission including the configuration of the front transmission 1, transmission components can be shared with other types of transmission. Thus, transmissions with and without sub transmission can be assembled using common parts.

Figure 7:
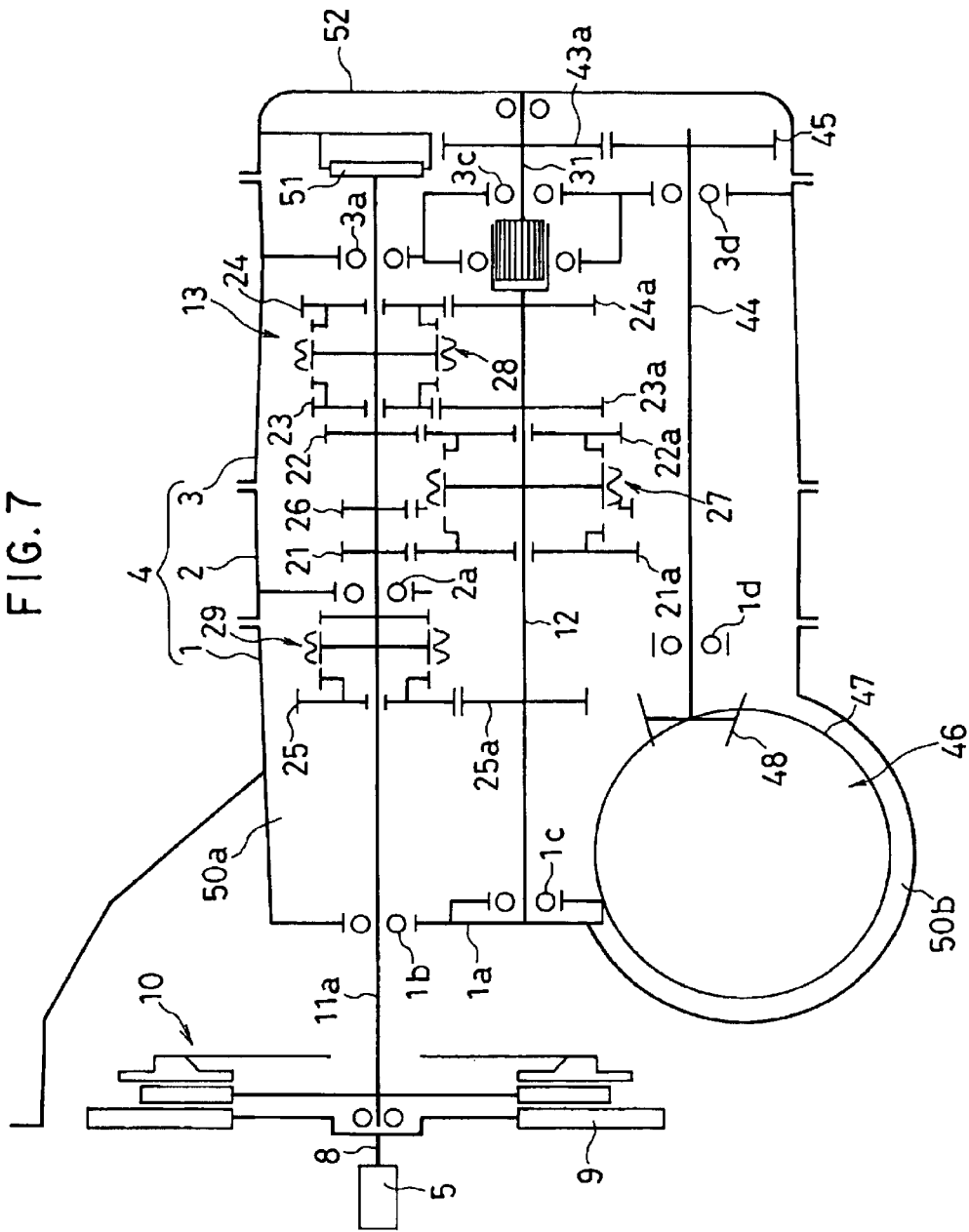
FIG. 7 is a skeleton diagram showing an automobile manual transmission according to a third embodiment of the present invention.
Figure 8:
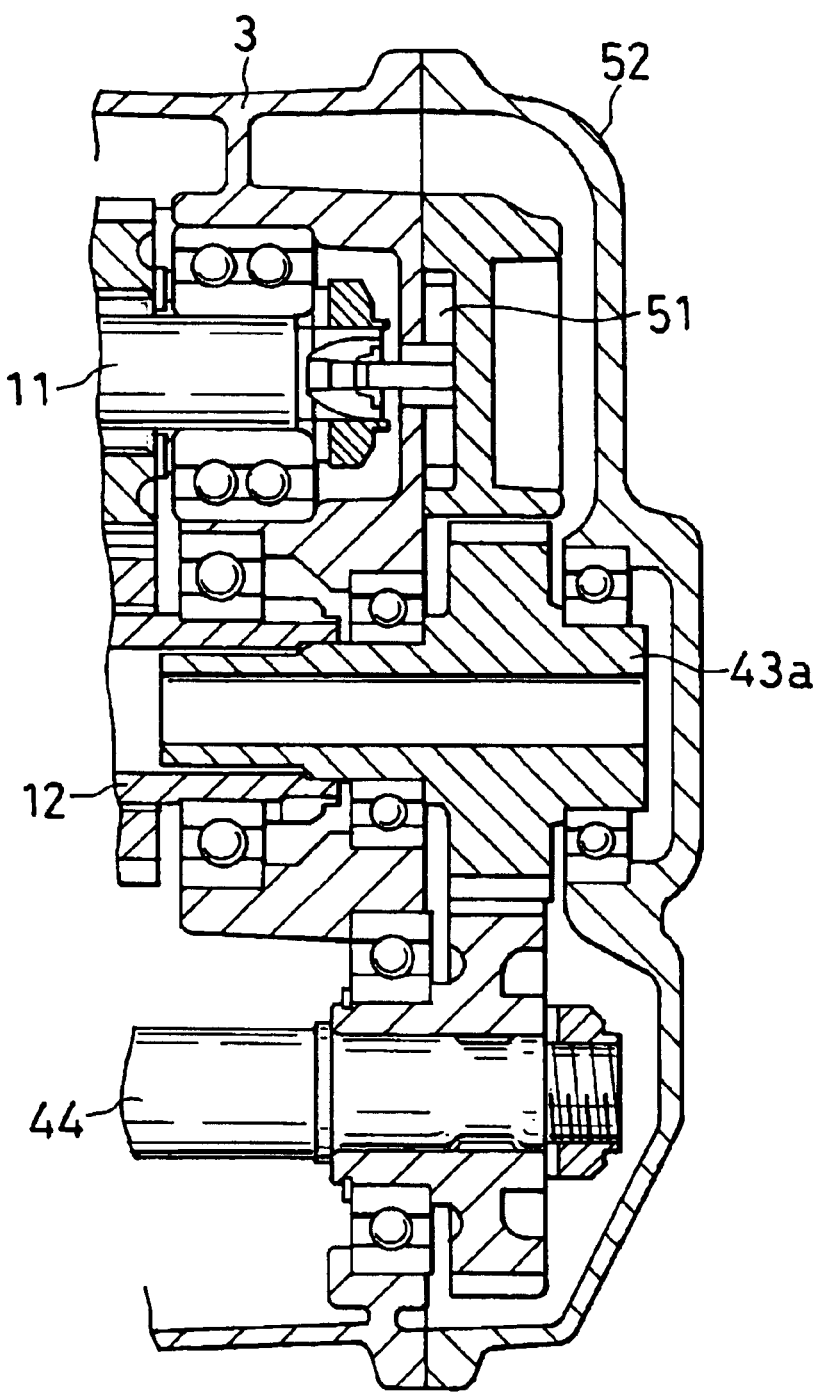
FIG. 8 is a partially sectional view showing a rear portion of the transmission of FIG. 7.

FIG. 7 is a skeleton diagram of an automobile manual transmission according to a third embodiment and FIG. 8 is a sectional view showing a rear part of the manual transmission. In these drawings, the components identical both to the second and third embodiments are denoted by identical reference numbers.

This manual transmission is applied to a front drive vehicle and the construction of the transmission according to this embodiment has the same construction as a transmission portion excepting a four wheel drive mechanism of the transmission according to the second embodiment. In place of the extension case 6 of the second embodiment, a cover 52 is attached to the rear end of the transmission case 4. Further, another type of a front drive gear 43a is mounted on the counter shaft 12. Thus, a transmission dedicated to the front drive vehicle is obtained.

In the transmission having no sub transmission as shown in FIGS. 5 and 7, by incorporating gears for $6^{th}$ or more speed ratios into the space 50a, it is possible to realize a multiple speed ratio transmission with $6^{th}$ or more speed ratios.

In the preferred embodiments described before, a manual transmission is primarily exemplified; however other types of transmission, for example, an automatic transmission may be replaced with the manual transmission. That is, the present invention may be applied also to the automatic transmission.

In summary, according to the present invention, components such as a transmission case, gear trains and the like can be shared among a transmission for four wheel drive vehicle with sub transmission, a transmission for four wheel drive vehicle without sub transmission and a transmission for front drive vehicle.

Further, since the differential is incorporated in the transmission case and left and right axle shafts for transmitting driving force to left and right wheels respectively can have an identical length and therefore these axle shafts can be shared with each other.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An automobile transmission for transmitting driving force of an engine to wheels while changing a rotation speed of a crankshaft of said engine, comprising;

a main shaft connected with said crankshaft through a clutch and having a plurality of first drive gears;

a counter shaft provided below and in parallel with said main shaft and having first driven gears meshing with said first drive gears and having a second drive gear;

a drive shaft provided below and in parallel with said counter shaft and having a second driven gear meshing with said second drive gear;

a front differential provided at a front end of said drive shaft;

a transmission case for accommodating said main shaft, said counter shaft, said drive shaft and said front differential; and a space formed in a front part of said transmission case; and a center differential provided at a rear end of said counter shaft for distributing a driving force into one for front wheels and one for rear wheels; and an extension case connected with a rear end of said transmission case for accommodating said center differential.

2. The transmission according to claim 1, further comprising;

a sub transmission accommodated in said space for transmitting driving force of said engine to said main shaft through said counter shaft while reducing said rotation speed of said engine.

3. The transmission according to claim 2, wherein said sub transmission includes reduction gears mounted on said main shaft and said counter shafts.

* * * * *